(12) United States Patent
Zhang et al.

(10) Patent No.: US 7,265,987 B2
(45) Date of Patent: Sep. 4, 2007

(54) MOUNTING ASSEMBLY FOR DATA STORAGE DEVICE

(75) Inventors: Jie Zhang, Shenzhen (CN); Chien-Li Tsai, Tu Cheng (TW); Wen-Kang Lo, Tu Cheng (TW); Ke-Cheng Lin, Tu-Cheng (TW); Hsuan-Chen Chen, Tu-Cheng (TW)

(73) Assignees: Hong Fu Jin Precision Industry (ShenZhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,572

(22) Filed: Apr. 8, 2006

(65) Prior Publication Data

US 2006/0245160 A1  Nov. 2, 2006

(30) Foreign Application Priority Data

Apr. 29, 2005  (CN) .................... 200510034515.4

(51) Int. Cl.
*H05K 5/03* (2006.01)
(52) U.S. Cl. .................. 361/727; 361/685; 312/223.2; 248/316.4

(58) Field of Classification Search ............... 292/163, 292/300, 302; 361/679–687, 724–727; 248/229.14, 248/316.4; 312/223.2; 360/256.3
See application file for complete search history.

(56) References Cited

U.S. PATENT DOCUMENTS

| 5,764,477 | A | 6/1998 | Ohgami et al. ............ 361/683 |
|---|---|---|---|
| 6,185,103 | B1 | 2/2001 | Yamada ..................... 361/727 |
| 2006/0187632 | A1* | 8/2006 | Chen et al. ................. 361/685 |
| 2007/0019377 | A1* | 1/2007 | Chen et al. ................. 361/685 |
| 2007/0053148 | A1* | 3/2007 | Shi et al. .................... 361/684 |
| 2007/0076379 | A1* | 4/2007 | Hong et al. ................ 361/728 |

\* cited by examiner

*Primary Examiner*—Hung Van Duong
(74) *Attorney, Agent, or Firm*—Wei Te Chung

(57) ABSTRACT

A mounting assembly for a data storage device includes a data storage device, a base, a locking member, an operating member, a driving member and a resilient element. The data storage device includes a rear wall and a clipping member mounted to the rear wall. The base includes a bottom plate. The locking member and the driving member are slidably assembled on the bottom plate. The locking member engages with the clipping member to mount the data storage device in the base. The operating member is attached to the locking member on an opposite surface of the bottom plate. The driving member is driven by the locking member to push the data storage device out a certain distance. The resilient element retains the locking member at a locking position and drives the locking member back after the locking member is at an unlocking position.

18 Claims, 5 Drawing Sheets

MOUNTING ASSEMBLY FOR DATA STORAGE DEVICE

FIELD OF THE INVENTION

The present invention relates to a mounting assembly for a data storage device, and more particularly to a mounting assembly which readily attaches a data storage device to a portable electronic device.

DESCRIPTION OF RELATED ART

The production of portable electronic device has became mature and entered a meager profit era. Only cost down and bringing convenience to users can bring more competitive strength. Typically, data storage devices, such as hard disk drives (HDDs), and compact disk-read only memory (CD-ROM) drives, are attached to a base of a portable electronic device. However, fixing a data storage device with bolts is unduly laborious and time-consuming. The bolts after being unscrewed are very inconvenient to be stored, and are prone to be lost. Furthermore, because the interior space of the portable electronic device enclosure is very limited, some elements besides the data storage device must be detached first in order to gain extra operating space for carrying out the fixing operation.

What is desired, therefore, is a mounting assembly for readily attaching or detaching a data storage device to or from a portable electronic device.

SUMMARY OF INVENTION

In one preferred embodiment, a mounting assembly for a data storage device includes a data storage device, a base, a locking member, an operating member, a driving member and a resilient element. The data storage device includes a rear wall and a clipping member mounted to the rear wall. The base includes a bottom plate. The locking member and the driving member are slidably assembled on the bottom plate. The locking member engages with the clipping member to mount the data storage device in the base. The operating member is attached to the locking member on an opposite surface of the bottom plate. The driving member is driven by the locking member to push the data storage device out a certain distance. The resilient element retains the locking member at a locking position and drives the locking member back after the locking member is at an unlocking position.

Other advantages and novel features will become more apparent from the following detailed description of preferred embodiments when taken in conjunction with the accompanying drawings, in which:

DETAILED DESCRIPTION

Figure 1:
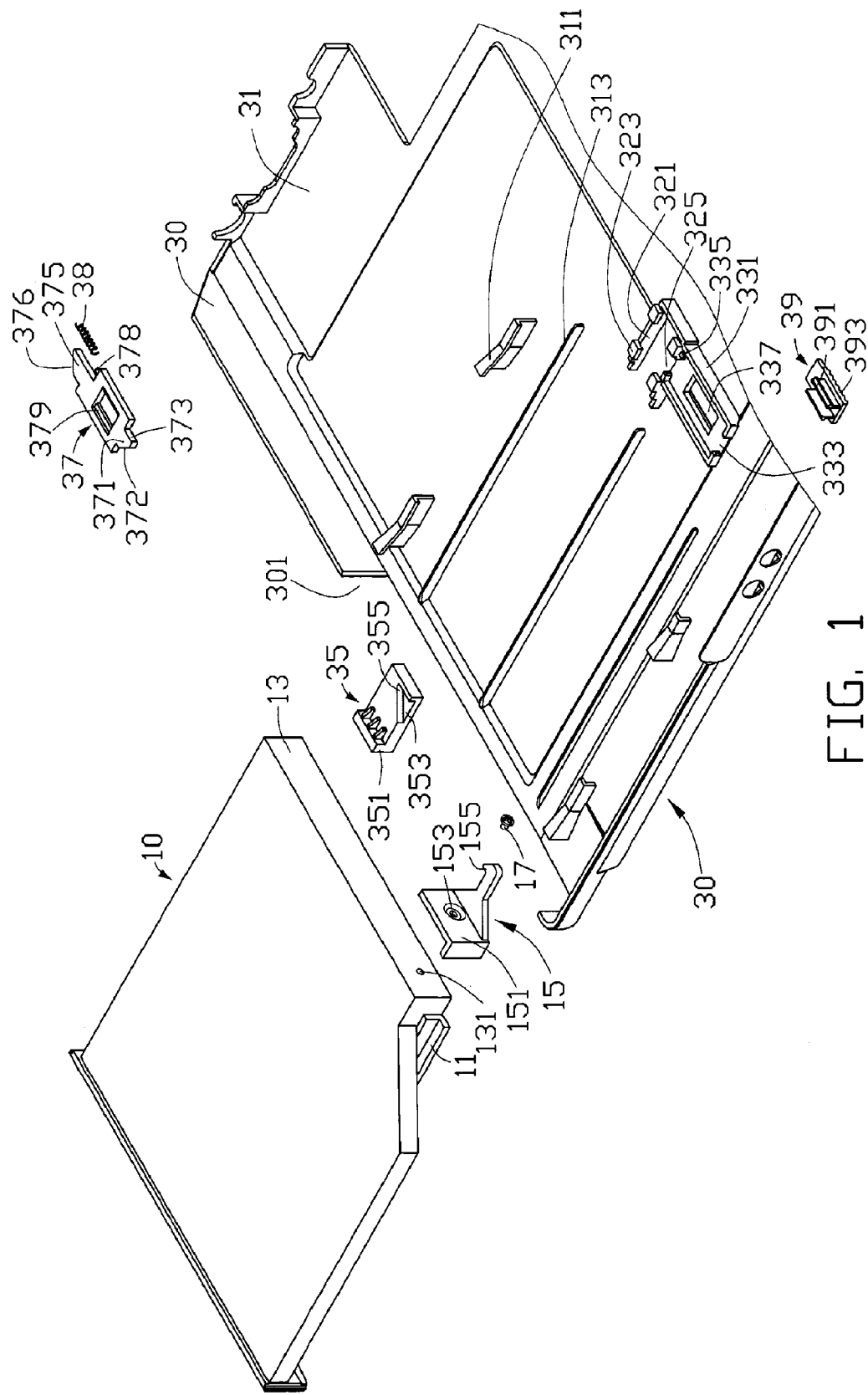
FIG. 1 is an exploded, isometric view of a mounting assembly in accordance with a preferred embodiment of the present invention, the mounting assembly includes a driving member, a locking member, a base and a data storage device.
Figure 2:
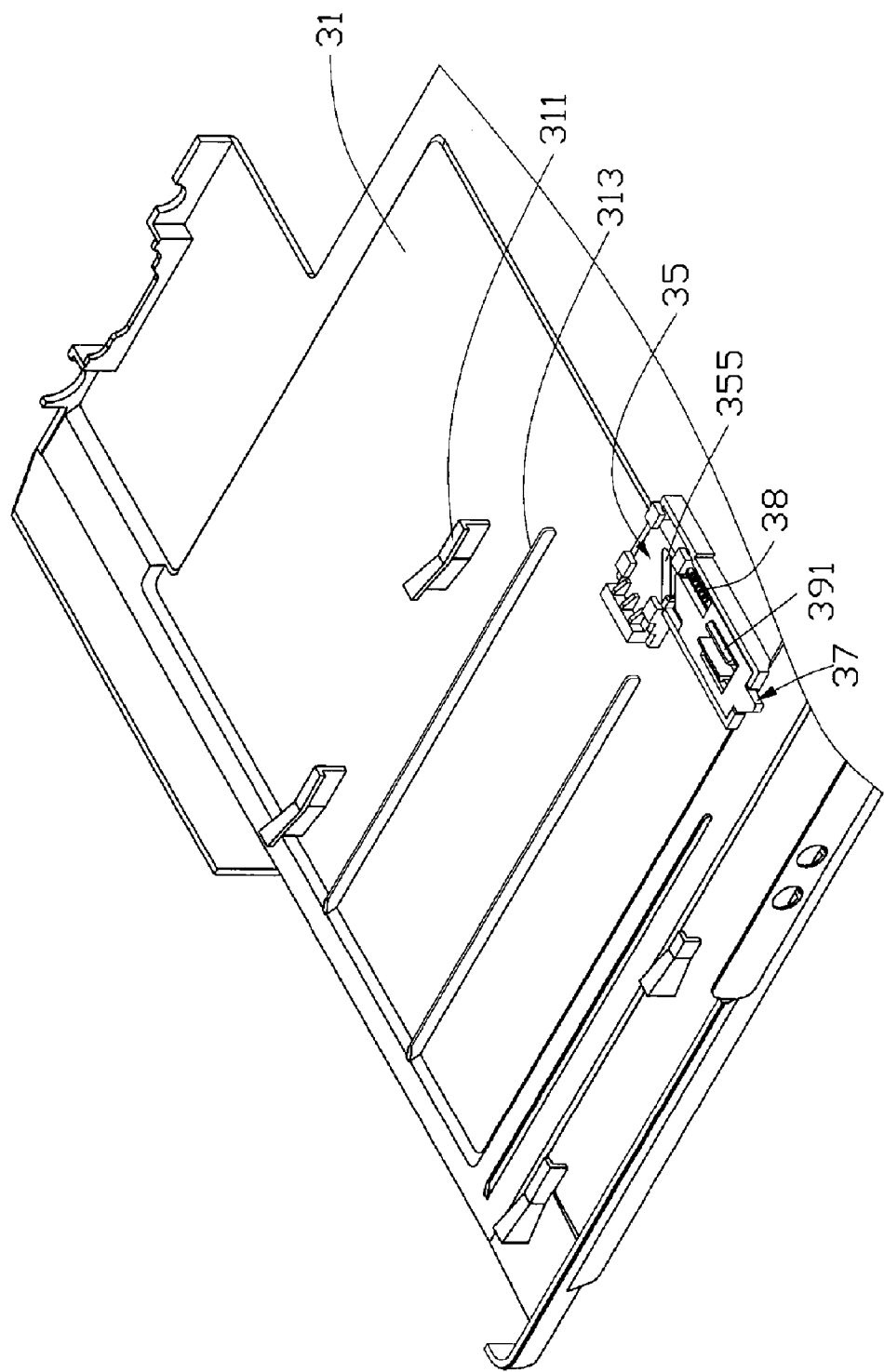
FIG. 2 is an assembled view of the driving member and the locking member engaging to the base of FIG. 1.

Referring to FIGS. 1 and 2, a mounting assembly in accordance with a preferred embodiment of the present invention includes a functional component like a data storage device 10, and a base 30 of a portable electronic device.

The data storage device 10 is a compact disk-read only memory (CD-ROM) drive or another electronic component, such as a hard disk drive (HDD). The data storage device 10 includes a pair of sliding rails 11 on its oppositional side walls respectively. The data storage device 10 includes a rear wall 13 defining a threaded hole 131.

A clipping member 15 is mounted to the rear wall 13 of the data storage device 10. The clipping member 15 includes an L-shaped positioning plate 151 and a hook 155. A through hole 153 is defined in the positioning plate 151. A screw 17 extends through the through hole 153 of the clipping member 15 and then engages in the threaded hole 131 of the data storage device 10, thus the clipping member 15 is mounted to the data storage device 10.

The base 30 includes a side plate 30 and a bottom plate 31. An opening 301 is defined in the side plate 30 for entry of the data storage device 10. A plurality of sliding portions 311 is formed from the bottom plate 31 corresponding to the sliding rails 11 of the data storage device 10. A plurality of retaining sheets 313 is formed from the bottom plate 31 for the data storage device 10 sliding in the base 30 easily. The bottom plate 31 includes a first securing portion 321 and a second securing portion 331. The first securing portion 321 is a U-shaped frame, and the left flange and the right flange of the frame form a plurality of tabs 323 extending into the frame. The left flange of the first securing portion 321 forms a cut 325 and a first protruding post 335 extending outward the frame. The second securing portion 331 is formed adjacent to the left flange of the first securing portion 321. A cutout 333 is formed in the left flange of the second securing portion 331, and a slot 337 is defined in the bottom plate 31 surrounding by the second securing portion 331.

A driving member 35 is slidably assembled in the first securing portion 321 of the base 30, and the tabs 323 of the first securing portion 321 limit the vertical movement of the driving member 35. The driving member 35 includes a driving portion 351 on its front end and a triangular notch 353 in its left rear portion. The notch 353 includes a first resisting plane 355.

A locking member 37 is slidably assembled in the second securing portion 331 of the base 30. A stopping portion 371 is formed from the left end of the locking member 37 corresponding to the hook 155 of the clipping member 15. The stopping portion 371 includes a sliding flange 372 and a stopping flange 373. A driving tab 375 is formed from the right end of the locking member 37 corresponding to the notch 353 of the driving member 35. The driving tab 375 includes a second resisting plane 376. A latching aperture 379 is defined in the body of the locking member 37 corresponding to the slot 337 of the bottom plate 31. A second protruding post 378 protrudes from the locking member 37 adjacent to the driving tab 375.

A spring 38 is assembled on the bottom plate 31. The first protruding post 335 and the second protruding post 378 are received in the two ends of the spring 38 respectively, and the spring 38 is compressable connected between the locking member 37 and the first securing portion 331.

An operating member 39 is attached to the locking member 37 on an opposite surface of the bottom plate 31. The operating member 39 includes an operating section 393 forming a plurality of ridges on a back surface thereof for facilitating manual operation. A pair of clasps 391 extends from an inner surface of the operating section 393.

Figure 3:
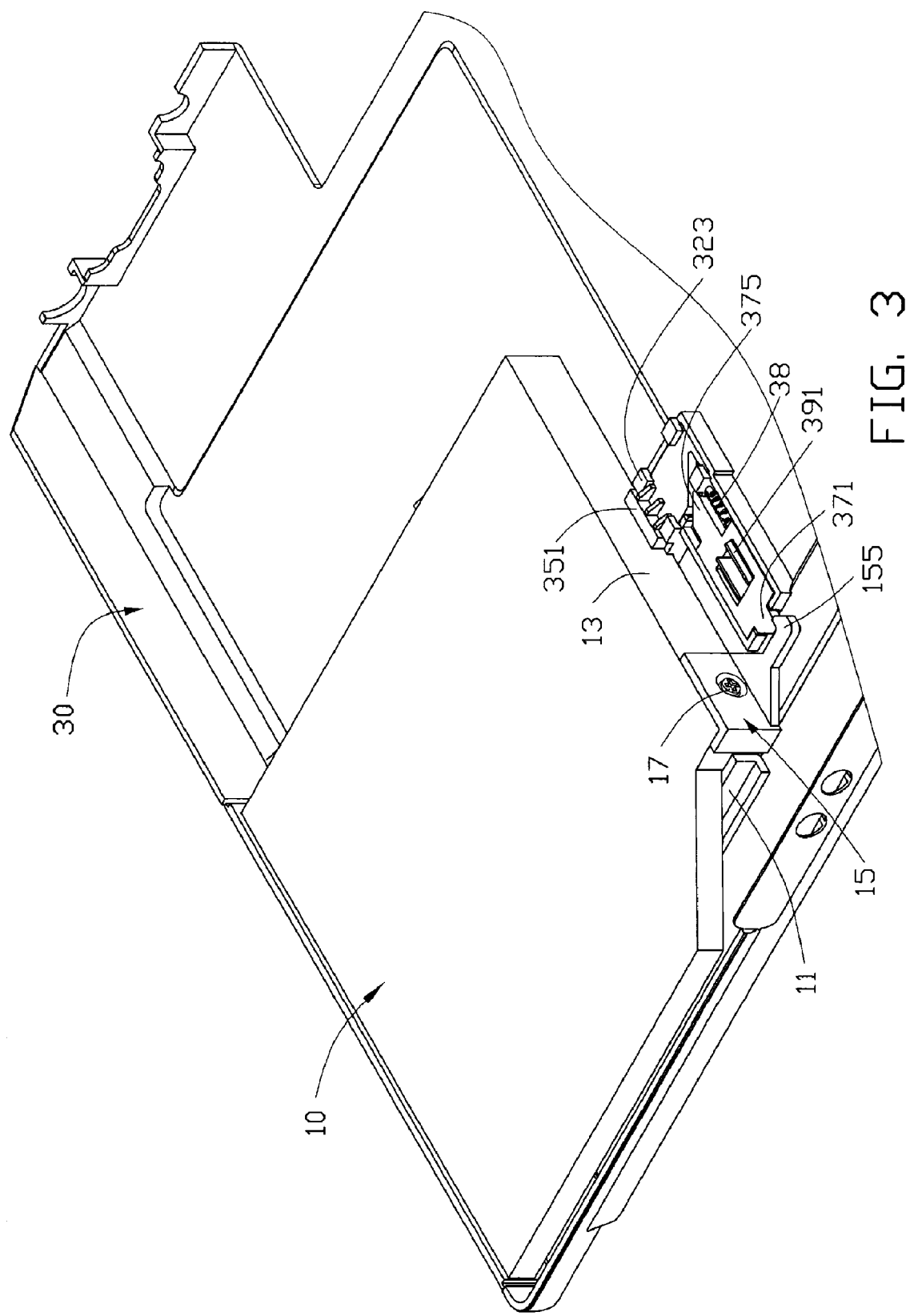
FIG. 3 is a assembled view of FIG. 1.
Figure 4:
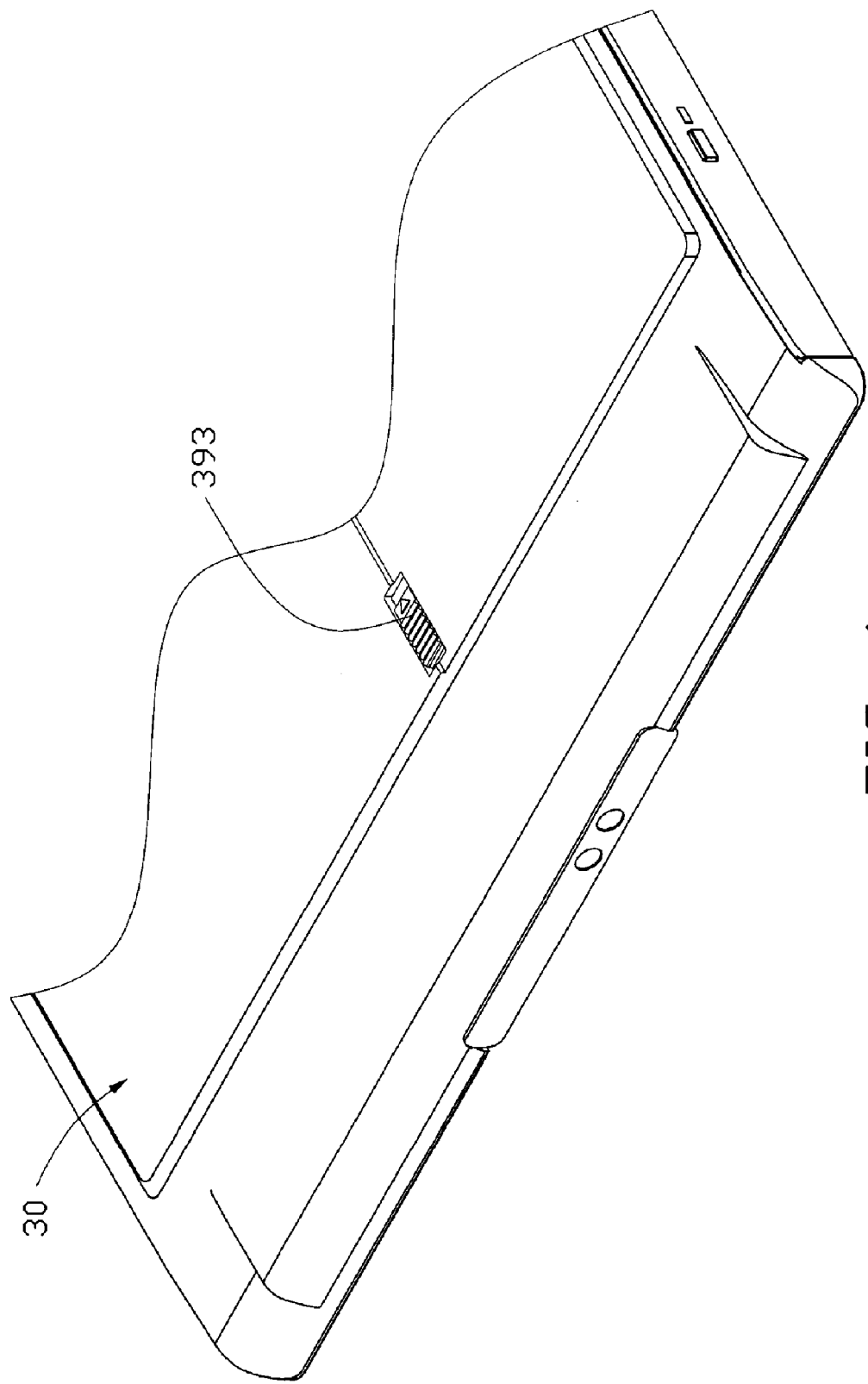
FIG. 4 is similar to FIG. 3, but viewed from another aspect.

Referring also to FIGS. 3 and 4, in assembly, the driving member 35 slides into the first securing portion 321 of the base 30, the locking member 37 and the spring 38 are assembled in the second securing portion 331 of the base 30, and the two ends of the spring 38 receive the first protruding post 335 and the second protruding post 378 respectively. The clasps 391 of the operating member 39 extend through the slot 337 and the latching aperture 379, and engage with the edges of the latching aperture 379, thus the locking member 37 can slide with the operating member 39 along the slot 337.

In assembling the data storage device 10, the data storage device 10 is pushed into the base 30 from the opening 301 along the retaining sheets 313. The hook 155 of the clipping member 15 pushes the sliding flange 372 of the locking member 37, thereby the locking member 37 is driven toward the driving member 35, and the spring 38 is compressed. When the hook 155 rides over the sliding flange 372, the locking member 37 is driven toward the clipping member 15 by the restoring force of the spring 38, thus the hook 155 engages with the stopping flange 373 of the locking member 37. Thereby the data storage device 10 is fixed in the base 30 of the portable electronic device.

Figure 5:
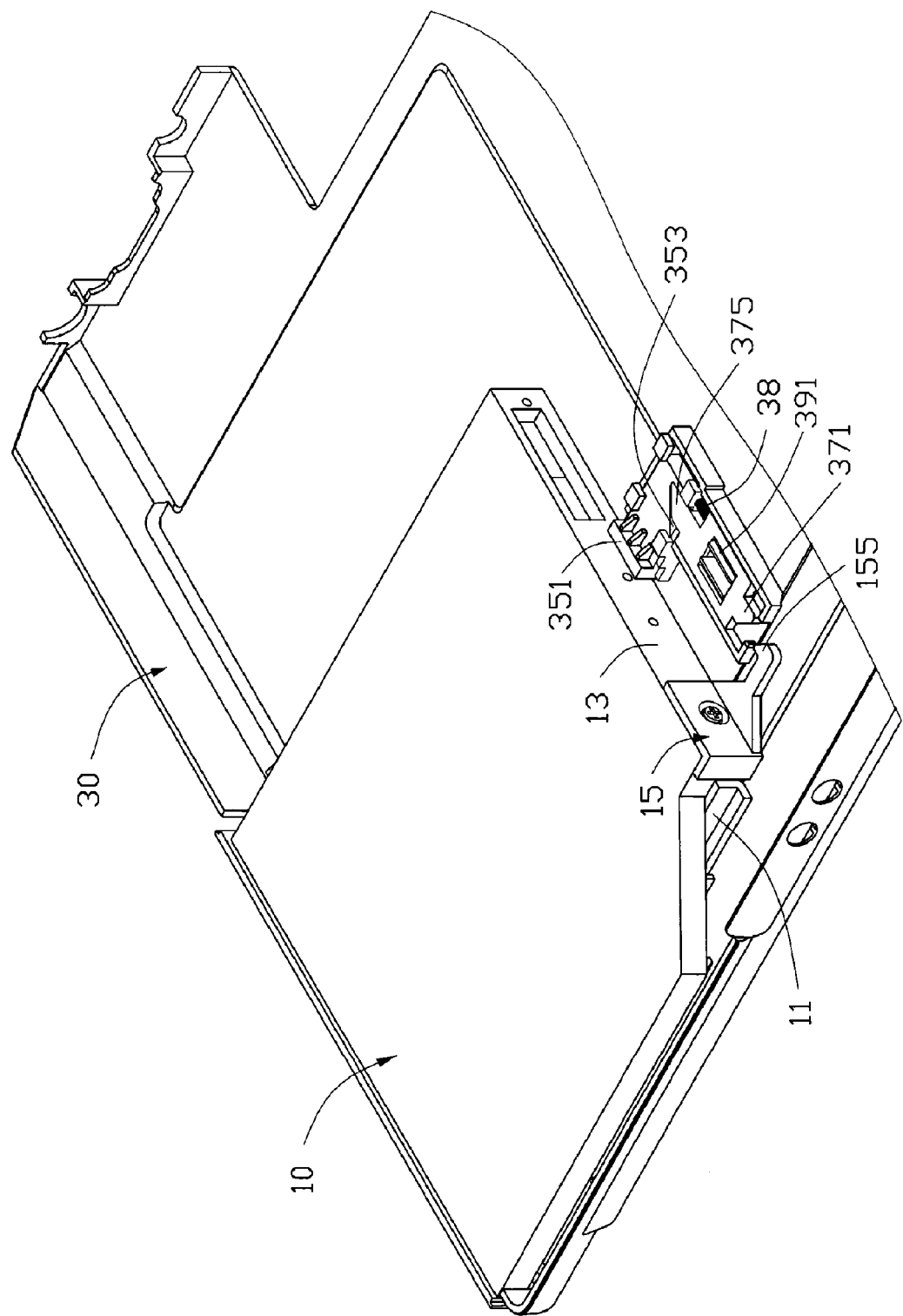
FIG. 5 is an assembled view of FIG. 3, but showing the data storage device is unlocked.

Referring also to FIG. 5, in detaching the data storage device 10, the operating section 393 of the operating member 39 is pushed from an external surface of the bottom plate 31. The operating member 39 drives the locking member 37 to move away from the clipping member 15. The spring 38 is compressed, the hook 155 disengages from the locking member 37, and the data storage device 10 is dismounted. The locking member 37 moves toward the driving member 35 continuously, the second resisting plane 376 of the driving tab 375 pushes the first resisting plane 355 of the driving member 35, thereby the driving member 35 is driven toward the data storage device 10, thus the data storage device 10 is pushed out a certain distance by the driving portion 351 of the driving member 35 pushing its rear wall 13, and the data storage device 10 facilitates being taken out from the base 30 of the portable electronic device. When the operating member 39 stops driving, the locking member 37 is driven back to a locking position by the restoring force of the spring 38.

In other embodiments, the spring 38 can be replaced by another resilient element, such as a resilient tab.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting assembly for a data storage device, comprising:
   a data storage device comprising a rear wall, and a clipping member mounted to the rear wall;
   a base receiving the data storage device, and the base comprising a bottom plate;
   a locking member slidably assembled on the bottom plate, the locking member engaging with the clipping member and mounting the data storage device to the base;
   an operating member attached to the locking member on an opposite surface of the bottom plate, wherein the operating member drives the locking member to move away from the clipping member, thereby the data storage device is dismounted;
   a driving member slidably assembled on the bottom plate, wherein the driving member is driven by the locking member to push the rear wall of the data storage device, thereby the data storage device is pushed out a certain distance and facilitates being taken out from the base; and
   a resilient element retaining the locking member at a locking position and driving the locking member back after the locking member being driven to an unlocking position.

2. The mounting assembly as claimed in claim 1, wherein the clipping member comprises a hook, the locking member comprises a stopping portion with a stopping flange, and the hook engages with the stopping flange of the locking member, thereby the data storage device is fixed in the base.

3. The mounting assembly as claimed in claim 1, wherein the driving member comprises a triangular notch with a first resisting plane, the locking member comprises a driving tab with a second resisting plane, the second resisting plane of the locking member pushes the first resisting plane, thereby the driving member is driven to push the data storage device slidably out of the base.

4. The mounting assembly as claimed in claim 1, wherein the locking member defines a latching aperture, the bottom plate defines a slot, the operating member comprises a pair of clasps, the clasps of the operating member extend through the slot and the latching aperture and engage with the edges of the latching aperture, thus the locking member can slide with the operating member along the slot.

5. The mounting assembly as claimed in claim 1, wherein the bottom plate comprises a securing portion with a first protruding post, and the locking member comprises a second protruding post, the resilient element is a spring, the first protruding post and the second protruding post are received in the two ends of the spring respectively, thereby the spring is compressable connected between the locking member and the securing portion.

6. The mounting assembly as claimed in claim 1, wherein the bottom plate comprises a securing portion, the securing portion is a U-shaped frame with a plurality of tabs, the driving member is slidably assembled in the securing portion, and the tabs limit the vertical movement of the driving member.

7. The mounting assembly as claimed in claim 1, wherein the data storage device comprises a pair of sliding rails on its oppositional side walls respectively, a plurality of sliding portions is formed from the bottom plate corresponding to the sliding rails of the data storage device.

8. The mounting assembly as claimed in claim 1, wherein a plurality of retaining sheets is formed from the bottom plate for the data storage device sliding in the base easily.

9. The mounting assembly as claimed in claim 1, wherein a threaded hole is defined in the rear wall of the data storage device, the clipping member comprises a positioning plate with a through hole, a screw extends through the through hole of the clipping member and then engages in the threaded hole of the data storage device, thus the clipping member is mounted to the data storage device.

10. A mounting assembly for a data storage device, comprising:
   a data storage device comprising a hook; and
   a base receiving the data storage device, the base comprising a bottom plate, a locking member and a driving member movably disposed to an inner side of the bottom plate, an operating member attached to the locking member on an opposite side of the bottom plate, a resilient element engaging to the base;

wherein when the data storage device is pushed into the base in a first direction, the hook drives the locking member to move in a second direction perpendicular to the first direction, and then engages with the locking member; and wherein when the operating member is moved in the second direction, the locking member is driven by the operating member to move in the second direction, thereby the hook disengages from the locking member, and the driving member is driven by the locking member to push the data storage device out the base.

11. The mounting assembly as claimed in claim 10, wherein a clipping member is mounted to the data storage device, the hook is formed from the clipping member, the locking member comprises a stopping portion with a stopping flange, and the hook engages with the stopping flange of the locking member, thereby the data storage device is fixed in the base.

12. The mounting assembly as claimed in claim 10, wherein the driving member comprises a triangular notch with a first resisting plane, the locking member comprises a driving tab with a second resisting plane, the second resisting plane of the locking member pushes the first resisting plane, thereby the driving member is driven to push the data storage device out of the base.

13. The mounting assembly as claimed in claim 10, wherein the locking member defines a latching aperture, the bottom plate defines a slot, the operating member comprises a pair of clasps, the clasps of the operating member extend through the slot and the latching aperture and engage with the edges of the latching aperture, thus the locking member can slide with the operating member along the slot.

14. The mounting assembly as claimed in claim 10, wherein the data storage device comprises a pair of sliding rails on its oppositional side walls respectively, a plurality of sliding portions is formed from the bottom plate corresponding to the sliding rails of the data storage device.

15. An electronic device comprising:
 a base of said electronic device enclosing said electronic device and defining a space therein;
 a component of said electronic device removably installable in said space of said base for functional extension of said electronic device, and movable into and out of said space of said base along a same direction; and
 a locking member movably installable beside said space and reachable to said component when said component is completely installed in said space, said locking member movable beside said space between a first position thereof where said locking member reachably engages with a first portion of said component to retain said component in said space, and a second position thereof where said locking member disengages from said first portion of said component to release said component, and simultaneously, reachably engages with a second portion of said component other than said first portion to drive said component out of said space along said direction.

16. The electronic device as claimed in claim 15, wherein said first portion and said second portion of said electronic device are formed along a planar side of said electronic device defined perpendicular to said direction.

17. The electronic device as claimed in claim 15, wherein a driving member is located between said locking member and said second portion of said electronic device so as to accept driving of said locking member and to transfer said driving toward said second portion of said electronic device.

18. The electronic device as claimed in claim 15, wherein said first portion of said electronic device is a clipping member extending out of said electronic device and having a hook therewith.

* * * * *